Patented Feb. 5, 1935

1,990,442

UNITED STATES PATENT OFFICE 1,990,442

COMPLEX COMPOUND OF METALS WITH ALIPHATIC POLYHYDRIC ALCOHOLS AND PROCESS OF PREPARING THE SAME

Wilhelm Traube and Fritz Kuhbier, Berlin, Germany, assignors to Winthrop Chemical Company, Inc., New York, N. Y., a corporation of New York No Drawing. Application December 14, 1931, Serial No. 581,048. In Germany March 21, 1930

34 Claims. (Cl. 260—11)

The present invention relates to new complex compounds of aluminium, trivalent chromium, trivalent iron, antimony and bismuth with aliphatic polyhydric alcohols containing at least three hydroxy groups at three adjacent carbon atoms, more particularly it relates to alkali- and alkaline earth metal-, tetraalkylammonium- and alkylenediamine-hydroxylates of such complex compounds and to a process of preparing the same.

Ferric hydroxide is not precipitated from the aqueous solution of ferric salts by means of alkalies when an aliphatic polyhydroxy compound, for instance, a polyhydric alcohol, is present in the solution. Thereby alkaline reacting solutions of a light color containing iron are obtained. When considering the question whether the iron is contained in the solution in the form of colloidal ferric hydroxide or in the form of a complex compound stable to alkali, the light yellow color of the solution gives rise to the suggestion that the iron is present in complex like linkage. However, up to this time well defined iron complex compounds could not be separated from the solution.

The present invention provides a process for obtaining iron complex compounds of aliphatic polyhydric alcohols and in a similar manner analogous compounds of aluminium, chromium, antimony and bismuth from their aqueous solutions in a pure state.

In accordance with one feature of the present invention complex compounds of trivalent iron, aluminium, trivalent chromium, antimony and bismuth are obtained in form of alkaline-earth metal hydroxylates, that is to say in form of calcium, barium and strontium hydroxylates, by reacting upon the alkaline reacting aqueous solution of an aliphatic polyhydric alcohol containing at least 3 hydroxy groups at three adjacent carbon atoms with a salt or hydroxide of trivalent iron, aluminium, trivalent chromium, antimony or bismuth and precipitating the metal complex compound formed by the addition of an alkaline-earth metal salt or hydroxide in the form of the corresponding alkaline-earth metal hydroxylates, which, in general, are insoluble or sparingly soluble in water. When reacting, for instance, upon an aqueous alkaline solution of ferric mannitol, prepared by the action of mannitol, an excess of sodium hydroxide and ferric chloride upon each other, with barium chloride, the reaction probably proceeds according to the following equation:

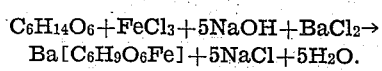

It may be mentioned that the use of more than 5 mols of caustic alkali as indicated in the above equation, in general, is of advantage for our new process. The formula $Ba(C_6H_9O_6Fe)+2H_2O$ corresponds to the result of the analysis. A more particular formula is presumably $$Ba[O_2C_6H_8(OH)-O_3Fe]+2H_2O.$$

In conformity with the latter formula the structural formula may perhaps be the following one:

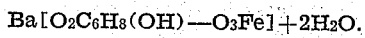
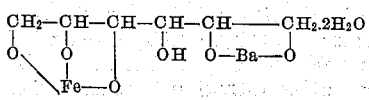

According to another feature of our present invention the usually water insoluble alkaline-earth metal hydroxylates of the metal complex compounds above specified may be transformed into water-soluble hydroxylates by reacting upon the said hydroxylates with the calculated quantity of an alkali metal, tetraalkylammonium or alkylenediamine salt, the anion of which forms alkaline-earth metal salts insoluble or sparingly soluble in water. For instance, when transforming the above described water insoluble barium-ferric mannitol into a water-soluble product the reaction probably proceeds according to the following equation:

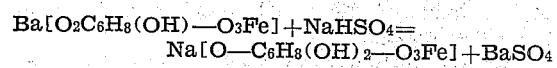

The sodium ferric-mannitol obtainable according to the above equation contains in 1 molecule of mannitol and 1 atom of complex bound iron only 1 atom of sodium. Accordingly the barium compound difficultly soluble in water and the corresponding other sparingly soluble alkaline earth metal hydroxylates are presumably basic hydroxylates whereas the readily water-soluble alkali metal hydroxylates and correspondingly the tetraalkylammonium and alkylenediamine hydroxylates are neutral hydroxylates of the metal complex compounds specified. In conformity therewith the aqueous solution of the sodium-ferric-mannitol remains clear on the addition of barium chloride and the basic sparingly water-soluble barium-ferric-mannitol precipitates only after the addition of ammonia or an aqueous caustic alkali solution to the said solution.

An analogous behaviour as described above for the barium compound of ferric-mannitol is displayed by the corresponding calcium and strontium hydroxylates on the one hand and the corresponding compounds containing instead of trivalent iron aluminium, trivalent chromium, antimony or bismuth as complex bound metal and instead of mannitol, for example, glycerol, erythritol, xylitol, sorbitol and dulcitol as polyhydric aliphatic alcohol on the other hand.

When preparing in the above described manner the barium-bismuth-mannitol, a sparingly water-soluble compound is obtained, wherein upon 2 molecules of mannitol and 2 atoms of bismuth only 1 atom of barium is contained. The barium-bismuth-mannitol corresponds accordingly to the following probable formula:

$$Ba[(C_6H_{11}O_6)_2(BiOH)_2].$$

When reacting upon an aqueous solution of barium hydroxide containing mannitol with antimony oxide and separating the complex compound formed by evaporating the solution or by precipitating with alcohol a barium-antimony mannitol of the probable formula:

$$Ba[C_{12}H_{16}(OH)_9O_3.SbOH]_2$$

is obtained which differs from the complex compounds of the other metals by its solubility in water. In the same manner the strontium hydroxylate of the antimony complex compound has proved soluble in water.

Our new process is advantageously performed by adding to an aqueous solution, containing about 1 molecule of the aliphatic polyhydric alcohol and an excess, for instance 5 molecules of a caustic alkali, at most 1 molecule of a water-soluble salt or of a hydroxide of one of the metals above specified. The solution thus obtainable, if necessary, after filtration is mixed with about 1 molecule of a water soluble alkaline-earth metal salt or hydroxide and the precipitate thereby formed separated from the liquid. Sometimes a small excess of the alkaline-earth metal compound may be of advantage. When employing a calcium salt or calcium hydroxide as earth-alkaline component, heating of the solution is in general required, in order to cause the precipitation of the calcium-metallic-complex compound formed.

The process may further be performed by first mixing an alkaline reacting solution of the aliphatic polyhydric alcohol with the alkaline-earth metal salt or hydroxide and then adding the salt or hydroxide of the metal entering in the complex-like linkage.

The transformation of the alkaline-earth metal hydroxylates of the metal complex compounds into the corresponding alkali metal, tetraalkylammonium or alkylenediamine hydroxylates is effected by reacting upon the aqueous suspension or solution of the alkaline-earth metal compounds while shaking or stirring with such a quantity of an alkali metal, tetraalkylammonium or alkylenediamine salt as is sufficient to precipitate the whole alkaline-earth metal ions present in the metal complex compound by means of the anions present in the quantity of alkali metal, tetraalkylammonium or alkylenediamine salt used. In general, at most such a quantity of the alkali metal, tetraalkylammonium or alkylenediamine salt as is equivalent to the quantity of alkaline-earth metal hydroxylates is required. When the double decomposition has become complete, the insoluble alkaline-earth metal salt is separated by filtering or centrifugalizing and the alkali metal, tetraalkylammonium or alkylenediamine hydroxylate of the metal complex compound formed is obtained from the filtrate by evaporating or precipitating by means of alcohol.

For the decomposition of the alkaline-earth metal hydroxylates of the metallic complex compounds with alkali metal, tetraalkylammonium or alkylenediamine salts preferably the salts of the sulfuric, oxalic and carbonic acid, for example, sodium and potassium-sulfate or -bisulfate, carbonate or -bicarbonate or oxalate or the corresponding salts of tetraalkylammonium, for example, tetramethyl- or tetraethyl ammonium, ethylenediamine, propylenediamine and the like have proved suitable.

Of particular value we consider the production of the complex compounds of iron, antimony and bismuth, preferably such ones as contain a hexahydroxy hexane, especially mannitol, as complex forming component and alkali, especially sodium, as base. Our new products may be used preferably for medicinal purposes, however, they may also serve for general technical use.

The following examples illustrate our invention without restricting it thereto, the parts being by weight.

Example 1

18 parts of mannitol are dissolved in 770 parts of a 4.5% aqueous solution of caustic soda free from carbonate, and about 12 parts of barium chloride dissolved in some water are added to the solution. The clear solution is then heated to boiling and into the stirred liquid 300 parts of a 4.5% ferric-chloride solution are dropped in. A light yellow micro-crystalline precipitate separates. The liquid is kept at the boil for some time, the precipitate is filtered or centrifugalized, washed with water several times and finally with alcohol and ether. After drying on an unglazed burned clay plate the compound of the probable formula $$Ba[O_2C_6H_8-(OH)-O_3Fe]aq.$$

is obtained as a light yellow fine powder. The yield amounts to 60–65%.

In order to transform the above basic barium-ferric-mannitol into a water-soluble product the compound evenly distributed in a small quantity of water is decomposed with a concentrated aqueous solution of ethylenediamine sulfate and the filtrate of barium sulfate formed is poured into alcohol. The ethylenediamine-ferric mannitol separating is a yellow powder, readily soluble in water, containing upon 2 molecules of mannitol 1 molecule of ethylenediamine and 2 atoms of iron.

When using instead of ethylenediamine sulfate tetramethyl- or tetraethylammonium sulfate or bisulfate tetramethylammonium or tetraethylammonium ferric mannitol are obtainable in an analogous manner.

Example 2

18 parts of mannitol are dissolved in 40 parts of a 10% aqueous solution of caustic soda. Precipitated ferric hydroxide is added to the solution but not until the same is completely saturated. When mixing the liquid with calcium chloride solution and heating, the ferric calcium compound of the mannitol of the probable formula $$Ca[C_6H_9O_6Fe]aq.$$

separates. The compound is filtered while hot and washed with hot water, alcohol and acetone and dried on an unglazed burned clay plate. It has similar properties as the barium compound described above. The yield amounts to 70%.

Example 3

9 parts of sorbitol are dissolved in 360 parts of a 4.5% aqueous solution of causitc soda free from carbonate and 65 parts of a 6–7% aqueous ferric-chloride solution are added to the liquid. The clear solution is then mixed with a concentrated aqueous solution of 6–7 parts of barium chloride and heated to boiling whereby a light yellow fine crystalline precipitate separates. The mixture is boiled for some time, sucked off and washed with a 2% aqueous solution of caustic soda, then with alcohol and ether and dried on an unglazed burned clay plate. The compound according to analysis corresponds to the formula: Ba(C₆H₉O₆Fe) aq. It is a light yellow fine powder. The yield amounts to 60-70%.

When using instead of the quantity of barium chloride above employed an equivalent quantity of strontium chloride, the corresponding strontium hydroxylate is obtained which displays similar properties as the barium hydroxylate.

In order to transform the above barium hydroxylate into a water-soluble product, 5 parts of the basic barium ferric-sorbitol are intimately mixed with 4 parts of water. To the mixture, cooled to 6° C., a solution of concentrated aqueous sodium bisulfate is added in such a quantity that the quantity of sulfuric acid contained therein will be sufficient for the transformation of all barium contained in the complex hydroxylate into barium sulfate. The decomposition is preferably accelerated by shaking or stirring. The light brown liquid containing the sodium-ferric-sorbite of the probable formula

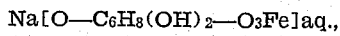
Na[O—C₆H₈(OH)₂—O₃Fe]aq., separated from the barium sulfate, is then mixed with a sufficient quantity of alcohol, whereupon the sodium-ferric-sorbitol is obtained as a precipitate, rapidly changing to a light yellow powder. The compound is readily soluble in water and contains upon 1 molecule of sorbite 1 atom each of iron and sodium.

*Example 4*

18 parts of glycerol are mixed with 40 parts of a 10% aqueous solution of caustic soda free from carbonate. In this mixture the ferric hydroxide, precipitated with dilute ammonia from a solution of 1.6 parts of ferric chloride in 100 parts of water, is dissolved. The resulting brown solution is treated with a barium hydroxide solution, whereupon the light-yellow barium-ferric-glycerol compound of the probable formula Ba₂[(C₃H₅O₃)₂FeOH]aq.

precipitates. The solution is centrifugalized, washed several times with alcohol and then with acetone and dried on an unglazed burned clay plate. The yield amounts to 60%.

*Example 5*

10 parts of erythritol are dissolved in 30 parts of a 9% aqueous solution of caustic soda. In this solution ferric hydroxide, precipitated by means of ammonia from 10 parts of a 6-7% aqueous solution of ferric chloride, is dissolved. Then a solution of 2 parts of barium hydroxide is added, the eventually precipitating barium carbonate is removed and the clear solution is treated with 150—200 parts of absolute alcohol. Thereby the barium compound of the ferric-erythritol of the probable formula C₂₄H₅₀O₂₄Fe₂Ba₃.aq. separates; after sucking off and washing with alcohol and ether it is a weakly yellow powder.

*Example 6*

4 parts of mannitol are dissolved in 70 parts of a 1.7% aqueous solution of caustic soda free from carbonate and 1.2 parts of bismuth nitrate, finely powdered, are introduced into this solution in small portions. The solution is heated until the greatest part of the bismuth hydroxide has dissolved, the liquid is separated from the undissolved part, diluted with 60 parts of water, cooled to room temperature and a solution of 1 part of barium chloride in 20 parts of water is added. The clear liquid is heated to boiling whereupon by and by a heavy fine crystalline precipitate separates which is sucked off while hot. A barium bismuth-mannite formed is a white powder stable in air, insoluble in water and contains according to the analysis upon 2 molecules of mannitol 2 atoms of bismuth and 1 atom of barium and has therefore probably the formula

Ba[C₁₂H₁₆(OH)₆O₆—Bi(OH)₂]aq.

The yield amounts to 50%.

*Example 7.*—11 parts of mannitol are dissolved in 28 parts of a 12% aqueous solution of caustic soda free from carbonate. The solution is mixed with 2 parts of calcium chloride and diluted with 80 parts of water. Then 6 parts of bismuth chloride are added and the solution is shaken or stirred until almost completely dissolved. After separating off the undissolvable parts, the clear liquid is heated to boiling. Calcium-bismuth-mannitol is thus obtained as a whitish precipitate. The compound is a white powder insoluble in water and corresponds in its composition to the above described barium hydroxylate. It has therefore probably the formula Ca[C₁₂H₁₆(OH)₆O₆—Bi(OH)₂]aq.

The yield amounts to 60%.

The above described barium and calcium hydroxylate of bismuth-mannitol may be transformed into the water-soluble sodium-bismuth-mannitol by double decomposition with sodium sulfate or carbonate in the repeatedly described manner. It has probably the formula

Na[C₁₂H₁₆(OH)₉O₃—Bi(OH)]aq.

*Example 8.*—18 parts of sorbitol are dissolved in 5 parts of a 4% aqueous solution of caustic soda and 0.7 parts of antimony oxide are introduced while heating, whereby solution takes place. The sodium-antimonyl-sorbitol formed is isolated advantageously by precipitating the solution with alcohol, whereby the sodium-antimonyl-sorbitol is obtained as a whitish precipitate, readily soluble in water. The compound corresponds to the formula

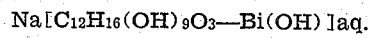
Na[C₁₂H₁₆(OH)₉O₃—Sb(OH)]

The yield amounts to 50-60%.

*Example 9*

5.4 parts of mannitol are dissolved in 350 parts of a 3% aqueous solution of caustic soda free from carbonate and about 6 parts of barium chloride dissolved in 100 parts of water are added. The solution is heated to boiling and into the stirred liquid a solution of 8 parts of chromic chloride in 100 parts of water are dropped in, whereby the barium-chromic-mannitol compound separates in fine-crystalline form. The liquid is kept boiling for some time, the precipitate is sucked off and washed with water and alcohol. The complex compound is obtained as a light green, fine powder, insoluble in water. According to analysis the compound corresponds to the formula C₆H₉O₆BaCr+5—6H₂O and has probably the following structural formula

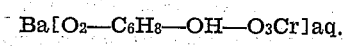
Ba[O₂—C₆H₈—OH—O₃Cr]aq.

The yield amounts to 50-60%.

In order to transform the barium-chromic-mannitol into a water-soluble product 10 parts thereof are made into a paste with 8-10 parts of water. After cooling the paste is mixed with such a quantity of a concentrated aqueous solution of sodium bisulfate as is required for precipitating the barium as barium sulfate (about 2.5 parts of sodium bisulfate). After some shaking the solution is separated from the barium sulfate formed and the sodium-chromic-mannitol is precipitated from the clear solution by means of alcohol as a light green, fine-crystalline powder. The precipitate is sucked off or centrifugalized, washed several times with alcohol, finally once with acetone and dried on an unglazed burned clay plate. The sodium-chromic-mannitol is soluble in water. In contains upon 1 molecule of mannitol 1 atom each of chromium and sodium. It corresponds probably to the formula $$Na[O-C_6H_8(OH)_2-O_3Cr]aq.$$

*Example 10*

5.4 parts of mannitol, 300 parts of a 3% aqueous solution of caustic soda free from carbonate and 6-7 parts of barium chloride are dissolved and heated to boiling. Then a solution of 7.2 parts of aluminium chloride in 80 parts of water is introduced into the stirred liquid. After a short time the barium-aluminium-mannitol complex compound separates as a fine crystalline precipitate, which, after the liquid has boiled for some time, is sucked off and washed with water and alcohol. After drying the compound forms a white powder, insoluble in water. According to analysis the compound corresponds to the formula $C_6H_9O_6AlBa$, aq. The yield amounts to 50-60%.

In order to transform the barium-aluminium-mannitol into a water-soluble product 10 parts thereof are made into a paste with 6 parts of water. After cooling the paste is intimately mixed with a cooled concentrated aqueous solution containing 3.25 parts of sodium bisulfate. After two hours shaking the barium sulfate is separated by centrifugalizing and the clear solution which must not contain a remarkable quantity of barium ions is precipitated by means of alcohol. The sodium-aluminium-mannitol separates as a crystalline powder, it is centrifugalized of and washed with alcohol and acetone and dried on an unglazed burned clay plate. The new product is readily soluble in water, it contains upon 1 molecule of mannitol 1 atom each of aluminium and sodium. It corresponds probably to the formula $$Na[O-C_6H_8(OH)_2-O_3Al]aq.$$

*Example 11*

3.6 parts of mannitol are dissolved in 12 parts of a warm aqueous solution containing about 7-8% of barium hydroxide. To the liquid which is kept boiling 1.4 parts of antimony oxide which almost completely dissolves are added. When treating the clear cooled solution with alcohol, barium-antimonyl-mannitol separates as a fine crystalline precipitate. The new complex compound can also be obtained by concentration of the solution. The compound, being soluble in a small quantity of water, contains according to the analysis upon 4 molecules of mannitol 2 atoms of antimony and 1 atom of barium and apparently corresponds to the formula $$Ba[C_{12}H_{16}(OH)_9O_3-SbOH]_2.$$

When reacting upon the aqueous solution of the said barium hydroxylate with sodium sulfate, barium sulfate separates and a sodium hydroxylate may be obtained from the solution by evaporating or precipitating with alcohol. The sodium hydroxylate has probably the formula:

$$Na[C_{12}H_{16}(OH)_8O_4-SbOH]aq.$$

In a similar manner a complex compound of antimony may be obtained when starting with antimonic acid. For this purpose 7 grams of freshly precipitated antimonic acid paste are dissolved in a solution of 11 grams of mannite in 80 ccs. of water and 16.5 ccs. of 5 normal caustic potassium solution while gently heating. After cooling of the solution a barium chloride solution is added, whereby a voluminous precipitate of barium-antimony-mannitol containing antimony in the pentavalent state is obtained. The precipitate is sucked off, washed with water and dried. It is a whitish powder which decomposes on heating with a black coloration.

While we have described our invention in great detail and with respect to preferred embodiments thereof, we do not desire to limit ourselves to such details or embodiments, since many modifications and changes may be made and the invention embodied in widely different forms without departing from the spirit or scope of the invention in its broadest aspects. Hence we desire to cover all modifications and forms within the scope or language of any one or more of the appended claims. Particularly we wish to point out that in the following claims the use of metal hydroxides the metal component whereof enters into the complex like linkage is intended to include also the use of the metal hydroxides in statu nascendi as, for example, produced when adding a metal salt to an alkaline solution.

We claim:—

1. In the process of preparing metal complex compounds the steps which comprise reacting upon the aqueous solution of an alkaline reacting hydroxide and an aliphatic polyhydric alcohol, containing at least three hydroxy groups at three adjacent carbon atoms, with the hydroxide of a metal of the group consisting of aluminium, trivalent chromium, trivalent iron, antimony and bismuth and precipitating the complex compound formed by the addition of an alkaline-earth metal compound selected from the group consisting of the water-soluble salts and of the hydroxides thereof.

2. In the process of preparing metal complex compounds the steps which comprise reacting upon the aqueous solution of an alkaline reacting hydroxide and an aliphatic hexahydroxy hexane with the hydroxide of a metal of the group consisting of aluminium, trivalent chromium, trivalent iron, antimony and bismuth and precipitating the complex compound formed by the addition of an alkaline-earth metal compound selected from the group consisting of the water-soluble salts and of the hydroxides thereof.

3. In the process of preparing metal complex compounds the steps which comprise reacting upon the aqueous solution of an alkaline reacting hydroxide and one mol of an aliphatic polyhydric alcohol containing at least 3 hydroxy groups at 3 adjacent carbon atoms, with at most one mol of ferric hydroxide, and precipitating the complex compound formed by the addition of an alkaline-earth metal compound selected from the group consisting of the water-soluble salts and of the hydroxides thereof.

4. In the process of preparing metal complex compounds the steps which comprise reacting upon the aqueous solution of an alkaline reacting hydroxide and one mol of an aliphatic polyhydric alcohol containing at least 3 hydroxy groups at 3 adjacent carbon atoms, with at most one mol of antimony hydroxide, and precipitating the complex compound formed by the addition of an alkaline-earth metal compound selected from the group consisting of the water-soluble salts and of the hydroxides thereof.

5. In the process of preparing metal complex compounds the steps which comprise reacting upon the aqueous solution of an alkaline reacting hydroxide and one mol of an aliphatic polyhydric alcohol containing at least 3 hydroxy groups at 3 adjacent carbon atoms, with at most one mol of bismuth hydroxide, and precipitating the complex compound formed by the addition of an alkaline-earth metal compound selected from the group consisting of the water-soluble salts and of the hydroxides thereof.

6. The process which comprises reacting upon the aqueous solution of an alkaline reacting hydroxide and one mol of an aliphatic polyhydric alcohol, containing at least 3 hydroxy groups at 3 adjacent carbon atoms, with at most one mol of ferric hydroxide, and precipitating the complex compound formed by the addition of an alkaline-earth metal compound selected from the group consisting of the water-soluble salts and of the hydroxides thereof, then causing the alkaline-earth metal hydroxylate of the metal complex compound formed to react with at least an equivalent quantity of a salt selected from the group consisting of alkali metal, tetraalkyl ammonium and alkylenediamine salts, the anion of which salt forms with alkaline-earth metal ions salts difficultly soluble in water, and separating the alkaline-earth metal salt formed from the mixture.

7. The process which comprises reacting upon the aqueous solution of an alkaline reacting hydroxide and one mol of an aliphatic polyhydric alcohol, containing at least 3 hydroxy groups at 3 adjacent carbon atoms, with at most one mol of antimony hydroxide, and precipitating the complex compound formed by the addition of an alkaline-earth metal compound selected from the group consisting of the water-soluble salts and of the hydroxides thereof, then causing the alkaline-earth metal hydroxylate of the metal complex compound formed to react with at least an equivalent quantity of a salt selected from the group consisting of alkali metal, tetraalkyl ammonium and alkylenediamine salts, the anion of which salt forms with alkaline-earth metal ions salts difficultly soluble in water, and separating the alkaline-earth metal salt formed from the mixture.

8. The process which comprises reacting upon the aqueous solution of an alkaline reacting hydroxide and one mol of an aliphatic polyhydric alcohol, containing at least 3 hydroxy groups at 3 adjacent carbon atoms, with at most one mol of bismuth hydroxide, and precipitating the complex compound formed by the addition of an alkaline-earth metal compound selected from the group consisting of the water-soluble salts and of the hydroxides thereof, then causing the alkaline-earth metal hydroxylate of the metal complex compound formed to react with at least an equivalent quantity of a salt selected from the group consisting of alkali metal, tetraalkyl ammonium and alkylenediamine salts, the anion of which salt forms with alkaline-earth metal ions salts difficultly soluble in water, and separating the alkaline-earth metal salt formed from the mixture.

9. In the process of preparing ferric complex compounds the steps which comprise reacting upon the aqueous solution of one mol of mannitol, containing sodium hydroxide, with at most one mol of ferric hydroxide and precipitating the complex compound formed by the addition of a calcium compound selected from the group consisting of the water-soluble salts and the hydroxide thereof.

10. In the process of preparing antimony complex compounds the steps which comprise reacting upon the aqueous solution of one mol of mannitol, containing sodium hydroxide, with at most one mol of antimony hydroxide and precipitating the complex compound formed by the addition of a calcium compound selected from the group consisting of the water-soluble salts and the hydroxide thereof.

11. In the process of preparing bismuth complex compounds the steps which comprise reacting upon the aqueous solution of one mol of mannitol, containing sodium hydroxide, with at most one mol of bismuth hydroxide and precipitating the complex compound formed by the addition of a calcium compound selected from the group consisting of the water-soluble salts and the hydroxide thereof.

12. The process which comprises reacting upon the aqueous solution of an alkaline reacting hydroxide and an aliphatic polyhydric alcohol, containing at least three hydroxy groups at three adjacent carbon atoms, with the hydroxide of a metal of the group consisting of aluminum, trivalent chromium, trivalent iron, antimony and bismuth, and precipitating the complex compound formed by the addition of an alkaline-earth metal compound selected from the group consisting of the water-soluble salts and of the hydroxides thereof, then causing the alkaline-earth metal hydroxylate of the metal complex compound formed to react with at least an equivalent quantity of a salt selected from the group consisting of alkali metal, tetraalkyl ammonium and alkylenediamine salts, the anion of which salt forms with alkaline-earth metal ions salts difficultly soluble in water, and separating the alkaline-earth metal salt formed from the mixture.

13. The process which comprises reacting upon the aqueous solution of an alkaline reacting hydroxide and an aliphatic hexahydroxy hexane with the hydroxide of a metal of the group consisting of aluminum, trivalent chromium, trivalent iron, antimony and bismuth, and precipitating the complex compound formed by the addition of an alkaline-earth metal compound selected from the group consisting of the water-soluble salts and of the hydroxides thereof, then causing the alkaline-earth metal hydroxylate of the metal complex compound formed to react with at least an equivalent quantity of a salt selected from the group consisting of alkali metal, tetraalkyl ammonium and alkylenediamine salts, the anion of which salt forms with alkaline-earth metal ions salts difficultly soluble in water, and separating the alkaline-earth metal salt formed from the mixture.

14. The process which comprises reacting upon the aqueous solution of one mol of mannitol containing sodium hydroxide with at most one mol of ferric hydroxide and precipitating the complex compound formed by the addition of a calcium compound selected from the group consisting of the water-soluble salts and the hydroxide thereof, then causing the calcium hydroxylate of the ferric complex compound formed to react with at least an equivalent of a salt selected from the group consisting of sodium sulfate, bisulfate and carbonate, and separating the insoluble calcium salt formed.

15. The process which comprises reacting upon the aqueous solution of one mol of mannitol, containing sodium hydroxide, with at most one mol of antimony hydroxide and precipitating the complex compound formed by the addition of a calcium compound selected from the group consisting of the water-soluble salts and the hydroxide thereof, then causing the calcium hydroxylate of the antimony complex compound formed to react with at least an equivalent of a salt selected from the group consisting of sodium sulfate, bisulfate and carbonate, and separating the insoluble calcium salt formed.

16. The process which comprises reacting upon the aqueous solution of one mol of mannitol, containing sodium hydroxide, with at most one mol of bismuth hydroxide and precipitating the complex compound formed by the addition of a calcium compound selected from the group consisting of the water-soluble salts and the hydroxide thereof, then causing the calcium hydroxylate of the bismuth complex compound formed to react with at least an equivalent of a salt selected from the group consisting of sodium sulfate, bisulfate and carbonate, and separating the insoluble calcium salt formed.

17. A stoichiometrically composed alkali metal salt of a complex compound of antimony with an aliphatic polyhydric alcohol bearing at least 3 hydroxy groups at three adjacent carbon atoms, said product being soluble in water.

18. A stoichiometrically composed alkali metal salt of a complex compound of antimony with an aliphatic hexahydroxy hexane, said product being soluble in water.

19. The stoichiometrically composed sodium salt of a complex compound of antimony with an aliphatic hexahydroxy hexane, said product being soluble in water.

20. The stoichiometrically composed sodium salt of the complex compound of antimony hydroxide with mannitol, having the formula:

$$Na[C_{12}H_{16}(OH)_8O_4.SbOH]aq.$$

said product being soluble in water.

21. A stoichiometrically composed alkali metal salt of a complex compound of bismuth with an aliphatic polyhydric alcohol bearing at least 3 hydroxy groups at three adjacent carbon atoms, said product being soluble in water.

22. A stoichiometrically composed alkali metal salt of a complex compound of bismuth with an aliphatic hexahydroxy hexane, said product being soluble in water.

23. The stoichiometrically composed sodium salt of a complex compound of bismuth with an aliphatic hexahydroxy hexane, said product being soluble in water.

24. The stoichiometrically composed sodium salt of the complex compound of bismuth hydroxide with mannitol, having the formula:

$$Na[C_{12}H_{16}(OH)_9O_3.Bi(OH)]aq.$$

said product being soluble in water.

25. An alkaline earth metal hydroxylate of a complex compound obtainable by the process defined in claim 1, containing at least one free hydroxyl group.

26. An alkaline earth metal hydroxylate of a complex compound obtainable by the process defined in claim 2, containing at least one free hydroxyl group.

27. A metal complex compound containing at least one free hydroxyl group, obtainable by the process defined in claim 15.

28. A metal complex compound containing at least one free hydroxyl group, obtainable by the process defined in claim 16.

29. An alkali metal hydroxylate of a complex compound of trivalent iron with an aliphatic polyhydric alcohol bearing at least three hydroxy groups at three adjacent carbon atoms, said product being soluble in water and containing at least one free hydroxyl group.

30. An alkali metal hydroxylate of a complex compound of trivalent iron with an aliphatic hexahydroxy hexane, said product being soluble in water and containing at least one free hydroxyl group.

31. The sodium hydroxylate of a complex compound of trivalent iron with an aliphatic hexahydroxy hexane, said product being soluble in water, and containing at least one free hydroxyl group.

32. The sodium hydroxylate of the complex compound of trivalent iron with mannitol having the formula $$Na[O.C_6H_8(OH)_2O_3Fe]aq$$

said product being soluble in water and containing at least one free hydroxyl group.

33. A stoichiometrically composed complex compound of a metal of the group consisting of aluminium, trivalent chromium, trivalent iron, antimony and bismuth, with an aliphatic polyhydric alcohol bearing at least 3 hydroxy groups at three adjacent carbon atoms, said complex compound containing a basic component selected from the group consisting of alkali- and alkaline earth metals, tetra-alkyl-ammonium and alkylenediamines, and said compound being soluble in water in the form of the alkali metal or alkylenediamine salts and being in general insoluble in water in the form of the alkaline earth metal salts, and obtainable in accordance with the process of claim 1.

34. A stoichiometrically composed complex compound of a metal of the group consisting of aluminium, trivalent chromium, trivalent iron, antimony and bismuth, with an aliphatic hexahydroxy-hexane, said complex compound containing a basic component selected from the group consisting of alkali-and alkaline earth metals, tetra-alkyl ammonium and alkylenediamines, said product being soluble in water in the form of the alkali metal or alkylenediamine salts and being in general insoluble in water in the form of the alkaline earth metal salts, and said compound being obtainable in accordance with the process of claim 2.

WILHELM TRAUBE.
FRITZ KUHBIER.